United States Patent
Hofer et al.

(10) Patent No.: US 6,440,027 B1
(45) Date of Patent: Aug. 27, 2002

(54) SPEED DIFFERENCE-DEPENDENT HYDRAULIC COUPLING WITH TEMPERATURE COMPENSATION

(75) Inventors: Manfred Hofer; Siegfried Kaltmann, both of Graz (AT)

(73) Assignee: Steyr-Daimler-Puch Fahrzeugtechnik (AT)

( * ) Notice: Subject to any disclaimer, the term of this patent is extended or adjusted under 35 U.S.C. 154(b) by 0 days.

(21) Appl. No.: 09/762,071
(22) PCT Filed: Jan. 26, 2000
(86) PCT No.: PCT/AT00/00020
§ 371 (c)(1), (2), (4) Date: Jan. 30, 2001
(87) PCT Pub. No.: WO00/45062
PCT Pub. Date: Aug. 3, 2000

(30) Foreign Application Priority Data

Jan. 26, 1999 (AT) ............................................. 48/99 U

(51) Int. Cl.⁷ ........................... F16H 48/30; F16H 47/08
(52) U.S. Cl. .............................. 475/88; 74/650; 475/108
(58) Field of Search ........................ 475/88, 94, 108; 74/650

(56) References Cited

U.S. PATENT DOCUMENTS

| | | | |
|---|---|---|---|
| 3,637,327 A | 1/1972 | Kubiak ................. | 417/222 |
| 3,688,982 A | 9/1972 | McAninch et al. ....... | 236/93 |
| 4,094,393 A | 6/1978 | Spokas ................ | 192/82 T |
| 4,936,094 A | 6/1990 | Novacek .............. | 60/384 |
| 5,310,388 A | 5/1994 | Okcuoglu et al. ....... | 475/88 |
| 5,358,454 A | 10/1994 | Bowen et al. ......... | 475/94 |
| 5,536,215 A | 7/1996 | Shaffer et al. ........ | 475/88 |
| 5,595,214 A | 1/1997 | Shaffer et al. ........ | 137/517 |
| 5,611,746 A | 3/1997 | Shaffer .............. | 475/88 |
| 5,645,506 A * | 7/1997 | Mleczko ............. | 475/257 |
| 5,735,764 A | 4/1998 | Shaffer et al. ........ | 475/88 |
| 5,749,801 A * | 5/1998 | Teraoka et al. ....... | 475/88 |
| 5,827,145 A | 10/1998 | Okcuoglu ............. | 475/88 |
| 5,888,163 A | 3/1999 | Shaffer et al. ........ | 475/88 |
| 5,938,556 A | 8/1999 | Lowell ............... | 475/89 |
| 5,941,788 A | 8/1999 | Shaffer et al. ........ | 475/88 |
| 5,964,126 A | 10/1999 | Okcuoglu ............. | 74/650 |
| 6,041,903 A * | 3/2000 | Burns et al. .......... | 192/85 AA |
| 6,095,939 A * | 8/2000 | Burns et al. .......... | 475/88 |

* cited by examiner

Primary Examiner—Sherry Estremsky
Assistant Examiner—Tisha D. Lewis
(74) Attorney, Agent, or Firm—Robert F. McBeth

(57) ABSTRACT

The invention relates to a speed difference dependent hydraulic coupling, consisting of rotating drive casing (2), a hydrostatic displacement machine (7) disposed therein, an output shaft (3) and a friction coupling (6) for connecting the output shaft (3) to the drive casing (2), wherein pressure is built up in a pressure chamber (26; 85) when a different speed emerges between the drive casing and the output shaft, said pressure impinging upon the friction clutch (6). In order to more accurately compensate for temperature-dependent fluctuations in viscosity, a throttle valve (33) is provided that is formed by a valve body (48) guided in a valve chamber (4) and supported on an element whose length (47) depends upon the temperature, said body having a control edge (51) cooperating with a control port (55) of the valve chamber (40), wherein the control port (55) produces the connection between the pressure chamber (26; 85) and the chamber with the lower pressure.

10 Claims, 4 Drawing Sheets

SPEED DIFFERENCE-DEPENDENT HYDRAULIC COUPLING WITH TEMPERATURE COMPENSATION

Figure 1:
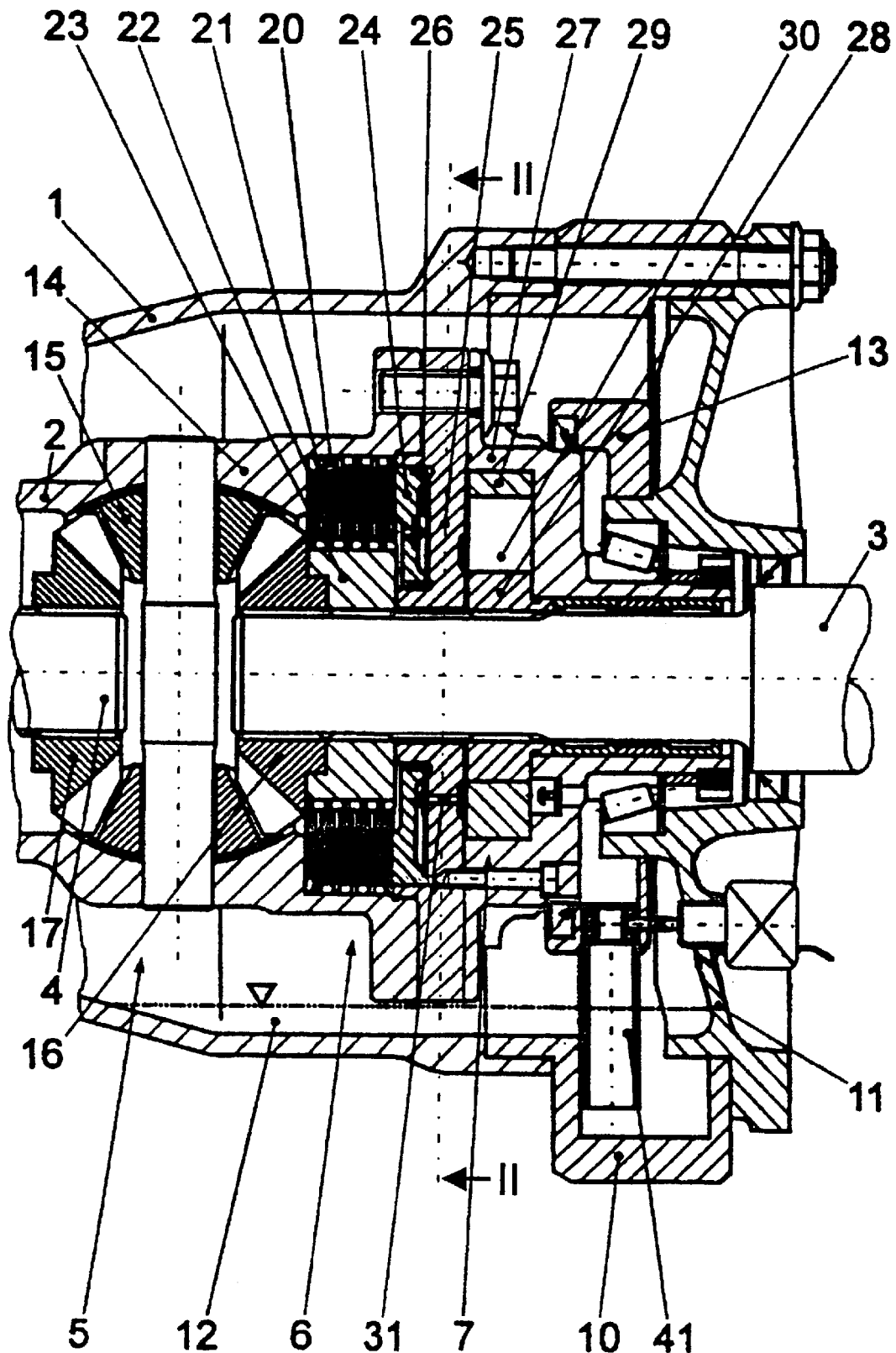

The invention relates to a difference-in-speed-dependent hydraulic coupling comprising a rotating drive casing, a hydrostatic displacement machine arranged therein, an output shaft and a friction clutch for connecting the output shaft to the drive casing, the occurrence of a differential speed between the drive casing and the output shaft producing, in a pressure chamber, a pressure which acts on the friction clutch, the pressure chamber being connected to a lower-pressure chamber via at least one valve.

Such couplings are used in different arrangements in the drive train of motor vehicles, for the direct transmission of a torque or for blocking a connected differential gear for the drive of the wheels of one axle or for the distribution of the drive torque between two axles. In each case, the hydrostatic displacement machine comprises an inner rotor and an outer rotor, which, in the case of a difference in speed between the drive casing and an output shaft, execute a relative movement and thus produce a pressure.

Such a coupling is known from U.S. Pat. No. 5,536,215, FIGS. 1 and 7. In this coupling, a valve formed by a small bimetallic plate is provided between the pressure chamber and a lower-pressure chamber, that is to say the coupling chamber, it being the intention for said valve to compensate for temperature-dependent changes in viscosity of the working fluid. However, apart from the notorious inaccuracy of bending bimetallic plates, the action of said valve is adversely affected by centrifugal forces, fluid pressure and further hydraulic forces.

The object of the invention is thus to configure a coupling of the generic type, with as straightforward and reliable a design as possible, such that temperature-induced fluctuations in viscosity are compensated for with a high level of accuracy and reliability.

This is achieved, according to the invention, by providing a throttle valve which is formed by a valve body which is guided in a valve chamber, is supported on an element of temperature-dependent length and has a control edge which interacts with a control opening of the valve chamber, the control opening producing the connection between the pressure chamber and the lower-pressure chamber.

The element of temperature-dependent length makes the temperature compensation independent of the centrifugal force, and provides, if the length is sufficient, a high level of accuracy and, together with the action of the control edges, sufficient force in order to maintain even high pressure. This renders possible a precisely reproducible throttle setting, which is essential to functioning because this determines the characteristics of the entire coupling unit.

The throttle valve is preferably formed in a valve plate in which the valve chamber is a bore which is located in an axis-normal plane and leads past the center axis at a small distance therefrom (claim 2). The valve plate requires only a very small amount of space in the axial direction, but nevertheless may contain a very long axis-normal bore in which a long element of temperature-dependent length is accommodated and the valve body is guided to good effect. Since the bore leads past the center axis at a small distance therefrom, the friction-producing influence of centrifugal force in the direction transverse to the movement direction of the valve body is low. The bore arranged in this way also provides space for an adjusting screw, with the result that the position of the valve body can be precisely adjusted.

In an advantageous embodiment, the valve plate is firmly connected to the drive casing, and the pressure chamber is formed between the valve plate and an annular piston which interacts with the friction clutch (claim 3). In another advantageous embodiment, the valve plate is firmly connected to the annular piston or is a part of the same, and the pressure chamber is between the rotating drive casing and the annular piston, which accommodates the hydrostatic displacement machine, the valve plate being provided on that side of the annular piston which is directed away from the friction clutch (claim 4). In both embodiments, the element of temperature-dependent length is at such a distance from the friction clutch that the frictional heat of the latter does not distort the thermal expansion of the element. It thus reacts only to the temperature of the fluid of which the change in viscosity is to be compensated for.

In a preferred development of the invention (claim 5),
 a) the control opening of the valve chamber forms an annular chamber which encloses said valve chamber and is connected to the pressure chamber,
 b) the valve body is a tube of which the side which is directed away from the element of temperature-dependent length forms the control edge and the side which is directed toward the element of temperature-dependent length has openings to the valve chamber, and
 c) the valve chamber is connected to a central bore of the valve plate.

The annular chamber around the control opening and the tubular formation ensure that the pressure acts on the valve body from all sides. This also allows the control edge to be machined cleanly. Through the openings on the side and the flow connection of the valve chamber to a central bore of the valve plate, the fluid flows past the element of temperature-dependent length, with the result that said element can rapidly follow the changes in temperature of the fluid.

In a refinement of the idea of the invention, the control edge is formed such that the pressure prevailing in the pressure chamber is independent of the temperature (claim 6). This achieves a particularly precise temperature compensation, the control edge formed on the valve body being particularly straightforward to machine.

The element of temperature-dependent length may advantageously either be a metal bellows which undulates in longitudinal section (claim 7) or consist of a suitable plastic (claim 8).

It also lies within the framework of the invention for the valve plate to be provided with a further bore which is located in an axis-normal plane, contains a spring-loaded piston and is connected to the pressure chamber (claim 9). This means that, as it were at the same time, with very low outlay and similar advantages, it is also possible to achieve damping of hydraulic pressure surges which could adversely affect the accuracy of the temperature compensation. In the same way, the valve plate could have a pressure release valve which is connected to the pressure chamber (claim 10).

Figure 2:
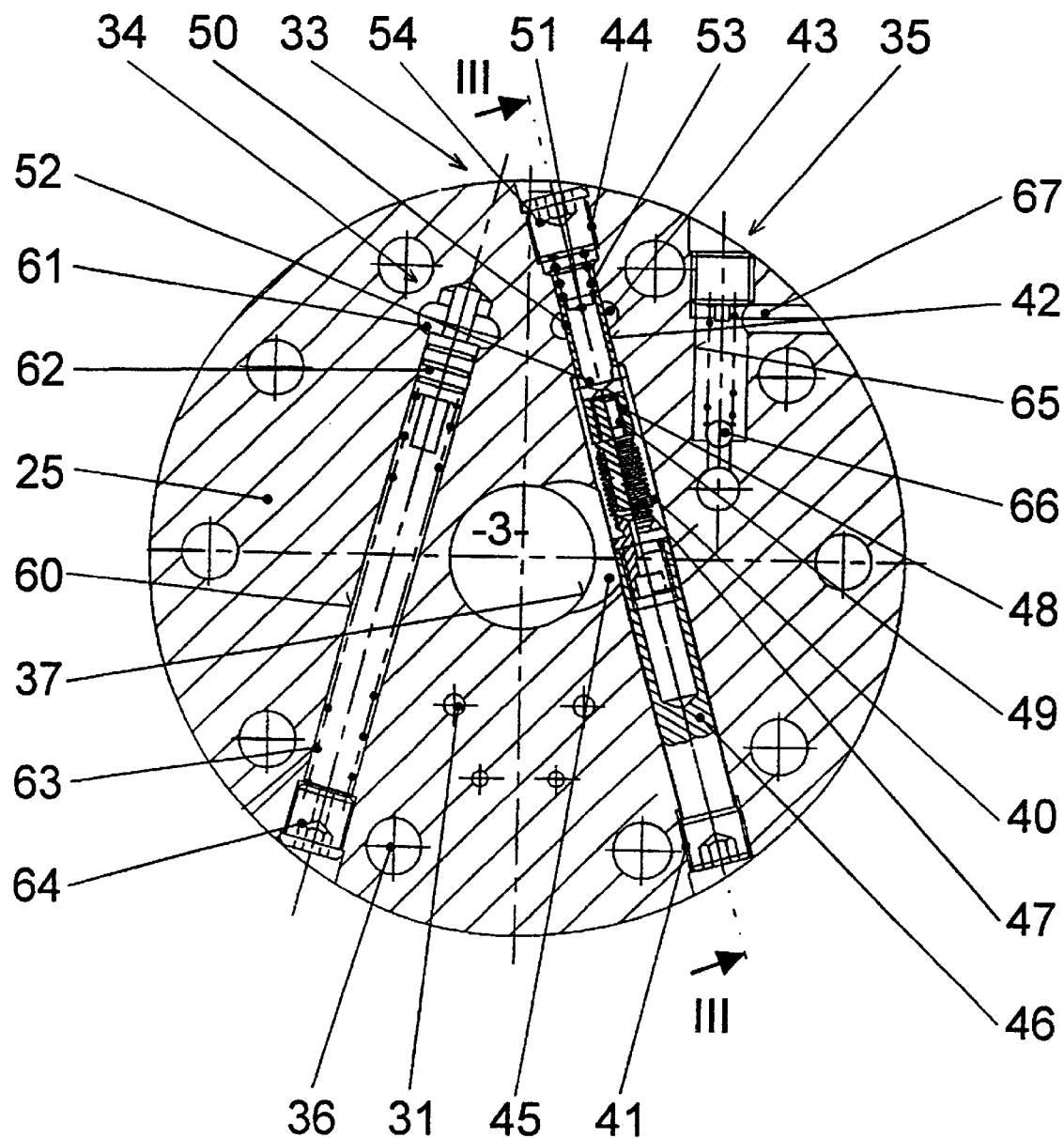
Figure 3:
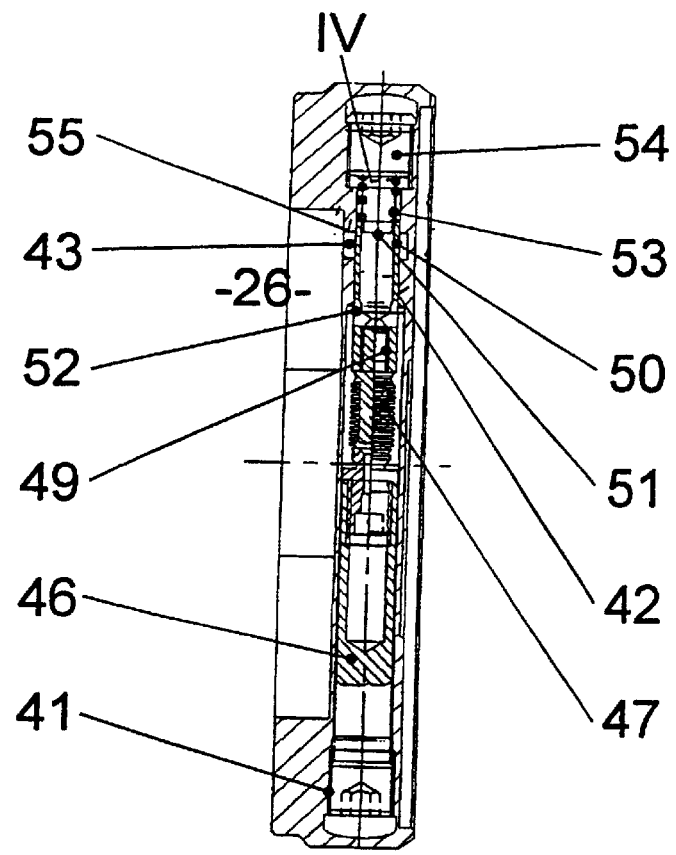
Figure 4:
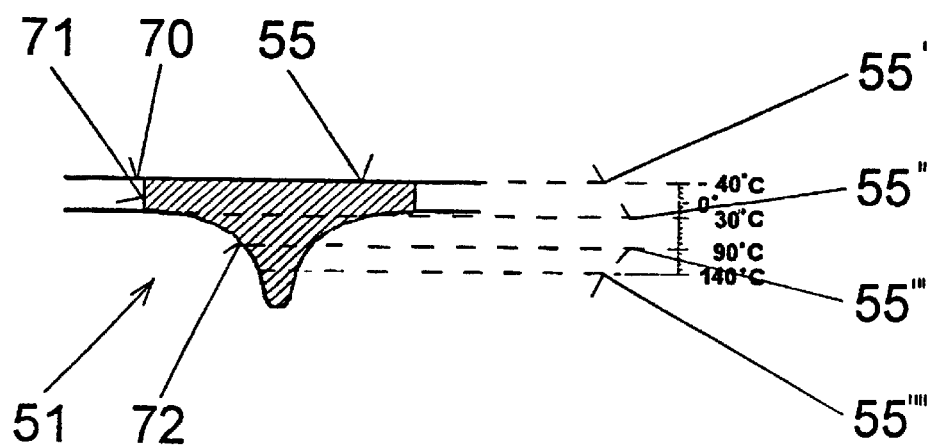
Figure 5:
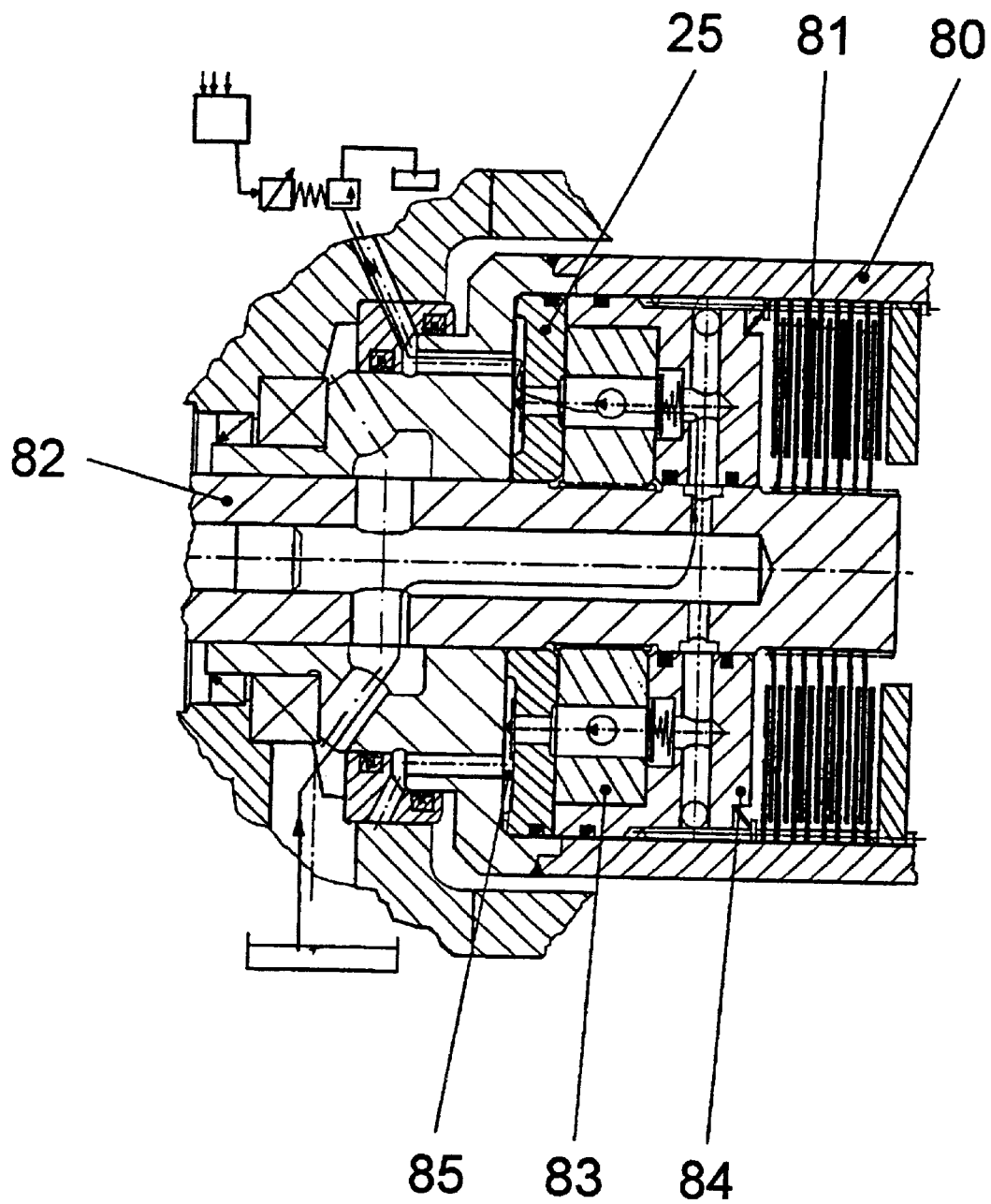

The invention is described and explained hereinbelow with reference to figures, in which:

FIG. 1 illustrates a longitudinal section through a hydraulic coupling according to the invention, FIG. 2 illustrates, on an enlarged scale, a cross section along II—II in FIG. 1, FIG. 3 illustrates a longitudinal section along III—III in FIG. 2, FIG. 4 illustrates, in a projected development and on a vastly enlarged scale, detail IV in FIG. 3 and, FIG. 5 illustrates a longitudinal section through a modified embodiment of a hydraulic coupling configured according to the invention.

In FIG. 1 the stationary casing of the drive unit is designated 1. A drive casing 2 is driven from a power source (not illustrated). A first output shaft 3 and a second output shaft 4 are drive-connected to the two wheels of one axle of a vehicle or to two axles of a vehicle, which is not illustrated. The two output shafts 3, 4 are driven by the drive casing 2 via a differential gear 5, which ensures, in a known manner, the distribution of torques between the two output shafts 3, 4. Furthermore, a differential-speed-dependent hydraulic coupling is provided between the drive casing 2 and the first output shaft 3, said coupling comprising a friction clutch 6 and a hydrostatic displacement machine 7.

The casing 1 is only indicated. It is screwed to a sump ring 10 and a bearing bracket 11. An oil sump 12 is located in the casing. A seal-carrying ring 13 is seated on the inside of the bearing bracket 11. The differential gear 5 comprises a differential casing 14, which forms part of the drive casing 2, compensation wheels 15 with their shaft, a first output bevel wheel 16, which is firmly connected to the first output shaft 3, and a second output bevel wheel 17, which is firmly connected to the second output shaft 4.

The friction clutch 6 is likewise accommodated in the differential casing 14, in the inner coupling teeth 20 of which outer plates 21 are arranged in a rotationally fixed but axially displaceable manner. Inner plates 22 are seated in a rotationally fixed manner on an inner clutch part 23, which is connected in a rotationally fixed manner to the first output bevel wheel 16. The friction clutch 6 also contains a piston 24 which, on the one hand, subjects the plates 21, 22 to pressure and, on the other hand, forms a pressure chamber 26 with a valve plate 25 fastened in the differential casing 14.

The displacement machine 7 is accommodated in a pump casing 27, screwed to the differential casing 14 and essentially comprises an inner rotor 28, which is connected in a rotationally fixed manner to the first output shaft 3, and an eccentric outer rotor 29, which can be rotated in the pump casing 27. Formed between the two rotors 28, 29 is a working chamber 30, the shape of which is determined by the design of the displacement machine. From the working chamber 30 at least one pressure channel 31 (see also FIG. 2) leads into the pressure chamber 26 of the friction clutch, it being possible, depending on the design of the displacement machine, to provide a plurality of pressure channels with corresponding self-controlling devices.

In FIG. 2, the valve plate 25 is shown in section. It contains, in an axis-normal plane, a throttle valve 33, a pulsation damper 34, and a pressure release valve 35. 36 designates the flange holes through which the valve plate 25 is screwed to the drive casing 2 and the pump casing 27. In the center, the valve plate 25 has a circular hole 37 through which the output shaft 3 passes with some amount of play.

The throttle valve 33 is formed in a cylindrical valve chamber 40, which is a cylindrical bore which is located in an axis-normal plane, leads past the output shaft 3 at a small distance therefrom and is open on both sides. The valve chamber 40 terminates, on one side, in a first thread 41 and forms, in the vicinity of the other end, a locating bore 42 and terminates there with a second thread 44. The locating bore 42 is interrupted by an annular chamber 43 which is open in the direction of the pressure chamber 26 (in FIG. 1). Approximately in the center, where the distance from the output shaft 3 is at its smallest, the valve chamber 40 is open in the direction of the circular hole 37, for which purpose a crescent 45, which cuts open the valve chamber 40, is milled in.

Located in the interior of the valve chamber 40 (see also FIG. 3) is a valve carrier 46 with a screw head screwed into the first thread 41. The valve carrier 46 is adjoined by an element of temperature-dependent length 47, in the exemplary embodiment shown a metal bellows of undulating longitudinal section, which is firmly connected to a valve body 48 via a screw connection 49. That part of the valve body 48 which is directed away from the element 47 is designed as a tube 50 with an inner flow channel and has, at its end, a control edge 51 which, in a manner which is yet to be described, interacts with a control opening 55 of the annular chamber 43. Provided on the other side of the tube are lateral openings 52 through which the interior of the tube 50 is in flow connection with the valve chamber 40. Also acting on the end of the tube 50 is a compression spring 53, which is supported on a threaded plug 54 screwed into the second thread 44.

The throttle valve 33 produces the connection between the pressure chamber 26 and a lower-pressure chamber, for example the interior of the friction clutch 6. The pressurized fluid passes out of the pressure chamber 26 into the annular chamber 43 and flows past the control edge 51, which interacts with the control opening of the annular chamber, into the interior of the tube 50, and through the lateral openings 52 into the valve chamber 40, where it flows past the element of temperature-dependent length 47 and the latter takes on the temperature of the fluid, and continues into the crescent 45 and, from there, via the circular hole and, as appropriate, further throughflow openings or channels into the interior of the friction clutch 6. The throughflow cross section released between the annular chamber 43 and the control edge 51 depends, by way of the action of the element of temperature-dependent length 47, on the temperature of the fluid. If said fluid is hotter, and its viscosity is thus lower, then the cross section is also smaller.

The pulsation damper 34 comprises a bore 60, which is connected to the pressure chamber 26 via an annular chamber 61, and a piston 62, which, on one side is subjected to the action of the pressure in the annular chamber 61 and, on the other side, is subjected to the action of a compression spring 63, which is supported on a threaded plug 64. The bore 60 is located, again, in an axis-normal plane and as closely as possible to the circular hole 37 in the valve plate 25. The valve plate 25 also contains the pressure release valve 35, which is accommodated in a further bore 65 which is located in an axis-normal plane. Said bore 65 is connected, via a spring-loaded ball valve 66, to a channel 67 which, in turn, is open in the direction of the pressure chamber 26. When a pressure defined by the ball valve is exceeded, fluid passes out through the outlet opening 67.

FIG. 4 shows the detail IV, the interaction of the control edge 51 with the axis-normal wall of the control opening 55 of the annular chamber 43. In order to simplify the illustration, the movement has been reversed. The control edge 51 is depicted in a stationary manner and the rectilinear edge 55 formed by the boundary of the annular chamber is depicted in different positions, each assigned to a certain temperature (between −40 and +140 degrees). The control edge 51 is symmetrical here and comprises a rectilinear axis-normal part 70 which is adjoined, at right angles, by a step 71, which is adjoined, in turn, by a curve 72, the shape of which is determined by physical laws. The two branches of the curve 72 form something of a "river valley" which, with a decreasing "water level"(the edge 55) of the flow, provides a decreasing cross section. The different positions of the border 55 of the annular chamber are illustrated by 55' to 55''''. For the position 55', the throughflow cross section is hatched. As the temperature increases, said cross section decreases to the part beneath the straight lines 55'', 55''' or 55''''.

It can be gathered from the above that the features which are essential for solving the problem reside in the configuration and arrangement of the valve plate 25. Accordingly, it is possible for the entire hydraulic coupling to be of very different configurations. The exemplary embodiment described in FIG. 1 is an embodiment which is combined with a differential and in which the pressure chamber 26 is located between the displacement machine and the clutch in a position firmly connected to the drive casing. The idea of the invention may likewise be applied to couplings of different constructions.

FIG. 5 thus shows a modified embodiment, in which a drive casing 80 drives an output shaft 82 via a friction clutch 81 without a differential being present. In this case, a hydrostat unit 83 is accommodated in a piston 84 which causes the friction clutch 81 to engage, and the valve plate 25 forms the cover of the piston 84. In this case, the valve plate 25 is spaced apart from the friction clutch 81 by a particularly large distance, as a result of which differences in temperature possibly originating therefrom are even smaller. The intermediate plate 25 forms, with the drive casing 80, a pressure chamber 85 which, in terms of the valve plate 25, corresponds precisely to the exemplary embodiment as described above.

What is claim is:

1. A difference-in-speed-dependent hydraulic coupling comprising a rotating drive casing (2; 80), a hydrostatic displacement machine (7) arranged therein, an output shaft (3) and a friction clutch (6) for connecting the output shaft (3) to the drive casing (2; 80), the occurrence of a differential speed between the drive casing and the output shaft producing, in a pressure chamber (26; 85), a pressure which acts on the friction clutch (6), the pressure chamber being connected to a lower-pressure chamber via at least one valve, wherein there is provided a throttle valve (33) which is formed by a valve body (48) which is guided in a valve chamber (40), is supported on an element of temperature-dependent length (47) and has a control edge (51) which interacts with a control opening (55) of the valve chamber (40), the control opening (55) producing the connection between the pressure chamber (26; 85) and the lower-pressure chamber.

2. The difference-in-speed-dependent hydraulic coupling as claimed in claim 1, wherein the throttle valve (33) is formed in a valve plate (25) in which the valve chamber (40) is a bore which is located in an axis-normal plane and leads past the center axis (3) at a small distance therefrom.

3. The difference-in-speed-dependent hydraulic coupling as claimed in claim 2, wherein the valve plate (25) is firmly connected to the drive casing (2), and the pressure chamber (26) is formed between the valve plate (25) and an annular piston (24) which interacts with the friction clutch (6).

4. The difference-in-speed-dependent hydraulic coupling as claimed in claim 1, wherein the valve plate (25) is firmly connected to a piston (35) or is a part of the same, and the pressure chamber (85) is between the rotating drive casing (80) and the piston (84), which accommodates the hydrostatic displacement machine (7), the valve plate (25) being provided on that side of the piston (84) which is directed away from the friction clutch (6).

5. The difference-in-speed-dependent hydraulic coupling as claimed in claim 1, wherein a) the control opening (55) of the valve chamber (40) forms an annular chamber (43) which encloses said valve chamber and is connected to the pressure chamber (26; 85), b) the valve body (46) is, at least in part, a tube (50) of which the side which is directed away from the element of temperature-dependent length (47) forms the control edge (51) and the side which is directed toward the element of temperature-dependent length has openings (52) to the valve chamber (40), and c) the valve chamber (40) is connected to a central bore (37) of the valve plate (25).

6. The difference-in-speed-dependent hydraulic coupling as claimed in claim 5, wherein the control edge (51) is formed such that the pressure prevailing in the pressure chamber (26; 85) is independent of the temperature.

7. The difference-in-speed-dependent hydraulic coupling as claimed in claim 1, wherein the element of temperature-dependent length (47) is a metal bellows which undulates in longitudinal section.

8. The difference-in-speed-dependent hydraulic coupling as claimed in claim 1, wherein the element of temperature-dependent length (47) consists of a suitable plastic.

9. The difference-in-speed-dependent hydraulic coupling as claimed in claim 2, wherein the valve plate (25) has a further bore (60) which is located in an axis-normal plane, contains a spring-loaded piston (62) and is connected to the pressure chamber (26; 85).

10. The difference-in-speed-dependent hydraulic coupling as claimed in claim 2, wherein the valve plate (25) has a pressure release valve (35) which is connected to the pressure chamber (26; 85).

* * * * *